United States Patent
Sytek et al.

(10) Patent No.: US 10,246,920 B2
(45) Date of Patent: Apr. 2, 2019

(54) TORSION ROD LOADING DEVICE AND ASSEMBLY

(71) Applicants: Christopher Sytek, Auburn Hills, MI (US); Thomas A Czapski, Plymouth, MI (US); Christopher J Duke, White Lake, MI (US); Alexander J Stanton, Auburn Hills, MI (US); Christopher J Antenucci, Rochester, MI (US); Randy Ihrke, Auburn Hills, MI (US)

(72) Inventors: Christopher Sytek, Auburn Hills, MI (US); Thomas A Czapski, Plymouth, MI (US); Christopher J Duke, White Lake, MI (US); Alexander J Stanton, Auburn Hills, MI (US); Christopher J Antenucci, Rochester, MI (US); Randy Ihrke, Auburn Hills, MI (US)

(73) Assignee: FCA US LLC, Auburn Hills, MI (US)

( * ) Notice: Subject to any disclaimer, the term of this patent is extended or adjusted under 35 U.S.C. 154(b) by 317 days.

(21) Appl. No.: 15/176,475

(22) Filed: Jun. 8, 2016

(65) Prior Publication Data
US 2017/0356229 A1  Dec. 14, 2017

(51) Int. Cl.
| | |
|---|---|
| *E05F 1/12* | (2006.01) |
| *F03G 1/02* | (2006.01) |
| *F03G 1/08* | (2006.01) |

(52) U.S. Cl.
CPC ............. *E05F 1/1238* (2013.01); *F03G 1/02* (2013.01); *F03G 1/08* (2013.01); *E05Y 2900/548* (2013.01)

(58) Field of Classification Search
CPC . E05F 1/1238; F03G 1/08; F03G 1/02; E05Y 2900/548

USPC .......... 296/76, 146.11; 16/298, 308; 49/386
See application file for complete search history.

(56) References Cited

U.S. PATENT DOCUMENTS

| | | | |
|---|---|---|---|
| 4,580,315 A | 4/1986 | Beckwith | |
| 5,758,389 A | 6/1998 | Wolda | |
| 6,419,293 B1 | 7/2002 | Nicholas et al. | |
| 6,447,043 B1 | 9/2002 | VandenHeuvel et al. | |
| 7,730,584 B2 | 6/2010 | Duffy | |
| 7,815,241 B2* | 10/2010 | Renke | E05D 5/062 16/375 |
| 8,708,394 B1 | 4/2014 | Sytek et al. | |
| 8,863,359 B1 | 10/2014 | Krajenke et al. | |
| 2012/0204491 A1* | 8/2012 | Cain | E05F 1/1033 49/386 |

FOREIGN PATENT DOCUMENTS

DE             3023950       *  1/1982

* cited by examiner

*Primary Examiner* — Dennis H Pedder
(74) *Attorney, Agent, or Firm* — Ralph E. Smith

(57) ABSTRACT

In at least one implementation, a torsion rod preload device, includes a body, a driver and a retainer. The body may have a base adapted to be connected to a vehicle and at least one stop. The driver is carried by the body for movement relative to the body, and is adapted to engage a torsion rod so that movement of the driver relative to the body increases a torsion force within the torsion rod. The retainer is carried by one or both of the body and the driver, and is movable by the driver as the driver moves relative to the body. The retainer is engageable with the stop to inhibit or prevent movement of the driver when the retainer is engaged with the stop to maintain a desired torsion force in the torsion rod.

19 Claims, 2 Drawing Sheets

TORSION ROD LOADING DEVICE AND ASSEMBLY

FIELD

The present disclosure relates to a torsion rod loading device that may be utilized for controlled or assisted movement of a vehicle panel, such as a deck lid.

BACKGROUND

Automobiles may include body panels that cover vehicle compartments, like a deck lid that covers a trunk of the vehicle. The deck lid may be hinged to the vehicle and movable between open and closed positions to selectively enclose and permit access to the trunk. The deck lid may be formed from one or more sheets of metal or other material and it may be desirable to provide a force on the deck lid that facilitates moving the deck lid to its open position. To provide such a force, a torsion rod has been installed in the trunk, spanning the width of the trunk between two hinges. The torsion rod needs to be installed under a relatively high force and can be difficult to install. Further, the torsion rod cannot be installed into the vehicle until after certain processes are complete, like painting, which can require relatively high heat that may adversely affect the torsion rod if the torsion rod is installed before such processes.

SUMMARY

In at least one implementation, a torsion rod preload device, includes a body, a driver and a retainer. The body may have a base adapted to be connected to a vehicle and at least one stop. The driver is carried by the body for movement relative to the body, and is adapted to engage a torsion rod so that movement of the driver relative to the body increases a torsion force within the torsion rod. The retainer is carried by one or both of the body and the driver, and is movable by the driver as the driver moves relative to the body. The retainer is engageable with the stop to inhibit or prevent movement of the driver when the retainer is engaged with the stop to maintain a desired magnitude of stored energy in the torsion rod.

In at least some implementations, a torsion rod assembly for a vehicle panel includes a body, a driver, two torsion rods and a retainer. The body has a base adapted to be connected to a vehicle and a wall having at least one stop. The driver is carried by the body for movement relative to the body. A first torsion rod is coupled to the driver so that movement of the driver relative to the body increases a torsion force within the first torsion rod. A second torsion rod coupled to the driver so that movement of the driver relative to the body increases a torsion force within the second torsion rod. And a retainer is carried by one or both of the body and the driver, and is movable by the driver and relative to the stop as the driver moves relative to the body. The retainer is engageable with the stop to inhibit or prevent movement of the driver when the retainer is engaged with the stop to maintain a desired torsion force in the torsion rods.

Further areas of applicability of the present disclosure will become apparent from the detailed description, claims and drawings provided hereinafter. It should be understood that the summary and detailed description, including the disclosed embodiments and drawings, are merely exemplary in nature intended for purposes of illustration only and are not intended to limit the scope of the invention, its application or use. Thus, variations that do not depart from the gist of the disclosure are intended to be within the scope of the invention.

DETAILED DESCRIPTION

Figure 1:
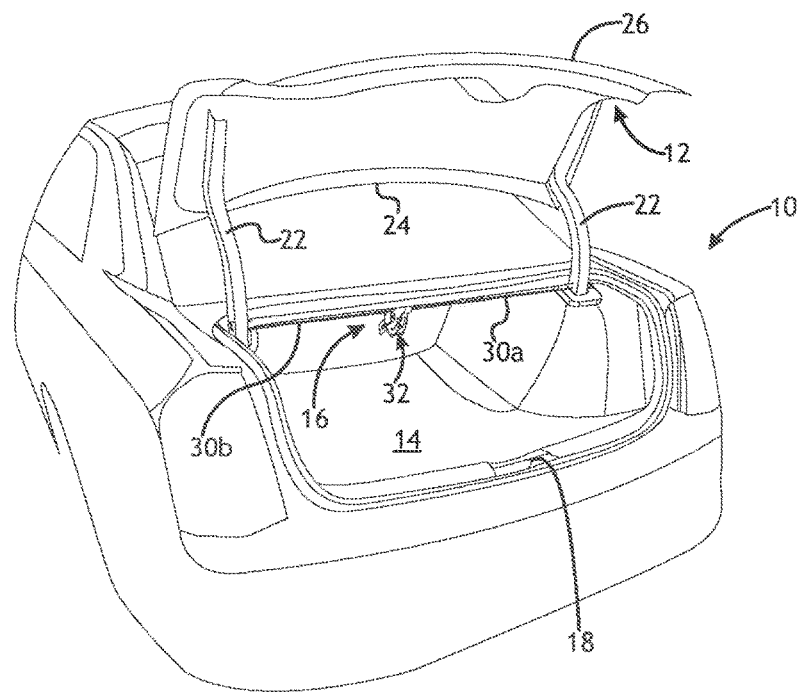
FIG. 1 is a perspective view of a rear portion of a vehicle illustrating a deck lid in an open position and showing hinges that support the deck lid and a torsion rod assembly associated with the deck lid.

Referring in more detail to the drawings, FIG. 1 illustrates part of a vehicle 10 including a movable deck lid 12 that may be closed to cover a vehicle compartment (sometimes called a trunk 14) and opened to permit access to the vehicle compartment. A torsion rod assembly 16 acts on the deck lid 12 to provide a force that yieldably biases the deck lid toward its open position. This force is overcome when the deck lid 12 is moved to its closed position, which position may be maintained by a latch or lock 18 as is well known. When the latch or lock 18 is released, the deck lid 12 may be displaced from its closed position toward or all the way to a fully open position by the force that the torsion rod assembly 16 applies to the deck lid.

In more detail, the deck lid 12 comprises one or more sheets of metal or other material shaped to enclose an opening of a vehicle trunk 14. The deck lid 12 may be coupled to the vehicle for movement between the closed and open positions. In at least some implementations shown, the deck lid 12 is coupled to the vehicle by one or more hinges 20. Two hinges 20a, 20b are shown in the illustrated example, with one hinge 20a mounted to the vehicle 10 on the passenger side and the other hinge 20b mounted to the vehicle on the driver side of the vehicle. The hinges 20a,b include or are connected to mounting brackets 22 that extend between the hinges 20a,b and the deck lid 12. The hinges 20a,b may be coupled to the deck lid 12 at or near a front portion 24 of the deck lid (portion closest to the front of the vehicle 10) so that the deck lid 12 is generally cantilevered with a back portion or edge 26 at a free end of the deck lid (and closest to the rear of the vehicle). The hinges 20a,b permit swinging and/or pivoted movement of the deck lid 12 in a sort-of clam shell fashion wherein the back edge travels a greater distance than does the front edge to provide a greater open area near the rear of the vehicle 10 as is known. The hinges 20a,b and/or brackets 22 may be contoured to provide clearance from adjacent vehicle surfaces during movement of the deck lid 12 and may rotate about pivots 28 of the hinges 20a,b.

The torsion rod assembly 16 may be associated with the deck lid 12 to provide a force tending to move the deck lid to or toward its open position. In at least some implementations, such as that shown in FIGS. 1 and 2, the torsion rod assembly 16 is coupled to the mounting brackets 22 and provides a force tending to pivot the brackets about the pivots 28 to bias the deck lid 12 toward its open position. The torsion rod assembly 16 thus extends in a "cross-car" direction which extends between the driver and passenger sides of the vehicle 10, and is perpendicular to forward or reverse travel of the vehicle. In assembly, the torsion rod assembly 16 is preloaded and stores potential energy that is exerted on the deck lid 12 when the deck lid is closed, and is at least partially released and applied to the brackets 22 to move the deck lid when the deck lid is unlocked (i.e. when the latch or lock is released). The energy in the torsion rod assembly 16 is stored in at least one resilient rod 30 that is elastically torqued (torsional force applied to the rod) or twisted to store energy in the rod and resiliently untwists to release energy. Further, the torsion rod 30 is mounted to the brackets 22 in such a way that energy is reloaded into the torsion rod as the deck lid 12 is moved toward the closed position so that the torsion rod is ready for a subsequent opening of the deck lid.

In at least some implementations, more than one torsion rod is provided, with a different torsion rod 30a,b acting on each brackets 22. In the example shown, two torsion rods are provided. A first torsion rod 30a is coupled to and between the first mounting bracket 22 and hinge 20a and a torsion device 32, and a second torsion rod 30b is coupled to and between the second mounting bracket 22 and hinge 20b and the torsion device 32. The torsion device 32 is operable to increase the torque on the rods 30a,b, and this may be done after the rods are fully assembled to the brackets 22 and torsion device 32. Further, this may conveniently and efficiently be done at a relative late stage of vehicle assembly, as will be set forth in more detail below.

Figure 2:
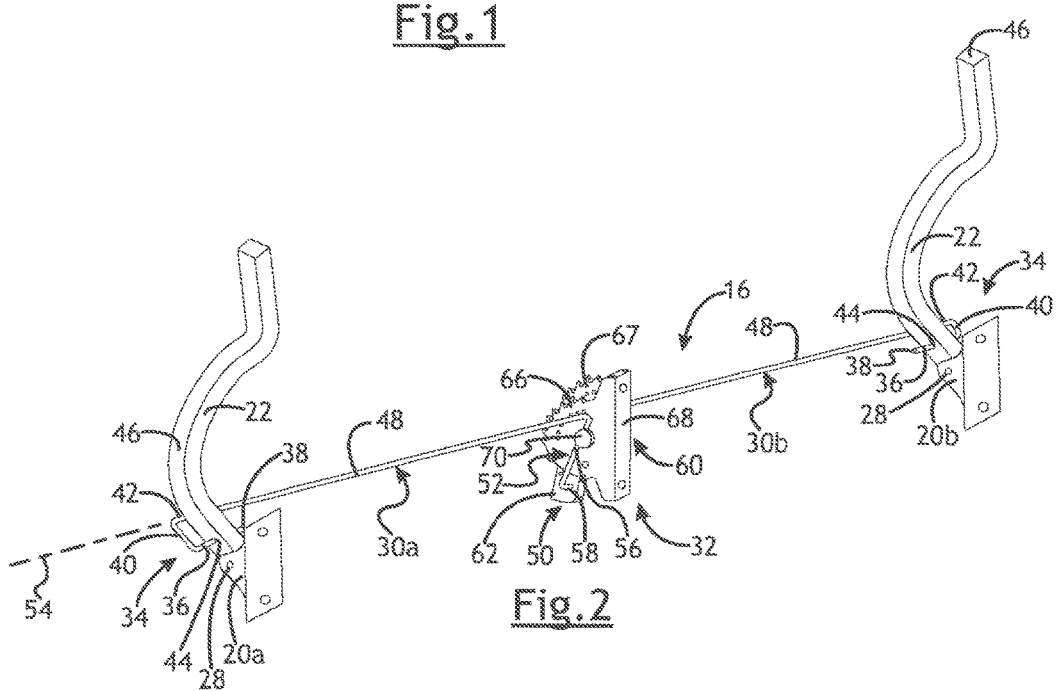
FIG. 2 is perspective view showing the hinges and torsion rod assembly.

The torsion rods 30a,b may be similar to each other (e.g. mirror images), so only one torsion rod 30a will be described in detail. The torsion rod 30a includes a first end 34 coupled to the bracket 22 for movement with the bracket. In the example shown, the first end 34 is bent into a "J" or hook shape and includes a first portion 36 extending to an end 38 of the hook, a middle section 40 with first and second bends, and a second portion 42 extending away from the middle section 40 and generally parallel to the first portion 36. The first portion 36 is received in and may extend through an opening 44 in the bracket 22 to retain the torsion rod 30a to the bracket 22. The first end 34 may be inserted into the opening 44 from an outer side surface 46 of the bracket 22 in a direction toward the torsion device 32 or other bracket 22. The free end 38 may be received between the outer side surface 46 of the bracket and the torsion device 32, and may protrude outwardly from the bracket 22. The middle section 40 may extend outwardly from the bracket 22 adjacent to the outer side surface 46, and the second portion 42 is adapted to engage and apply a biasing for to the bracket 22. In the example shown, the second portion 42 extends beneath the bracket 22 (relative to the direction of gravity and then installed as shown in FIGS. 1 and 2) and is spaced farther from the pivot that the first portion 36. The torsion rod 30a includes a main portion 48 that extends generally linearly from the second portion 42 of the first end 34 to a second end 50 that is coupled to the torsion device 32.

The second end 50 may include a bent portion 52 that defines a crank arm adapted to be coupled to the torsion device 32 to facilitate applying torque to the torsion rod 30a. The crank arm 52 is laterally offset from a longitudinal or main axis 54 of the torsion rod main portion 48 so that movement of the crank arm 52 about the main axis 54 creates torsion within the torsion rod 30a. The crank arm 52, in the example shown, is generally L-shaped, with a first portion 56 extending at an angle from the main axis 54 (shown as perpendicular) and a second portion 58 extending at an angle from the first portion 56 (shown as perpendicular). In this example, the second portion 58 of the crank arm 52 is generally parallel to and laterally offset from the main axis 54. One or both of the first portion 56 and second portion 58 of the crank arm 52 may be coupled to the torsion device 32.

Figure 3:
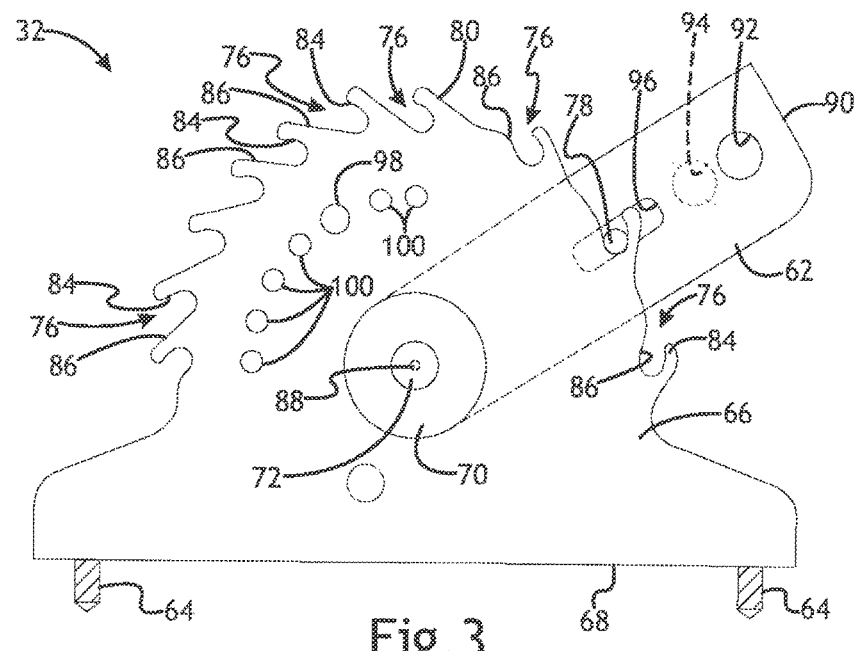
FIG. 3 is an enlarged side view of a control assembly of the torsion rod assembly.
Figure 4:
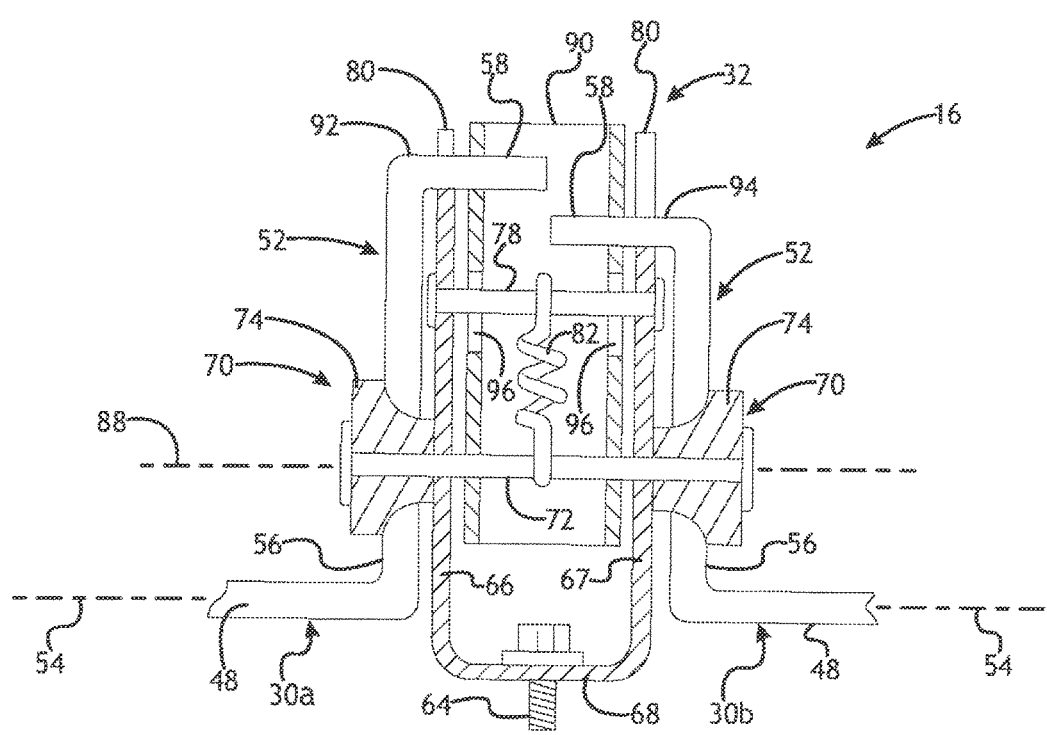
FIG. 4 is a sectional view of the control assembly.

The torsion device 32 includes a main body 60 and a driver 62. The main body 60 may be fixed to the vehicle 10 such as by one or more fasteners 64 so that the main body does not move in use. In the implementation shown, the main body 60 includes a pair of spaced apart walls (defined by plates 66, 67 in the illustrated example) that are joined at a base 68 that is fixed to the vehicle 10. As shown in FIGS. 2-4, each plate 66, 67 may include or carry a support 70 adapted to be engaged by and to brace a crank arm 52. A first plate 66 includes a first support 70 extending outwardly from the first plate toward the first bracket 22 and hinge 20a. The first support, in assembly, is engaged by the crank arm 52 of the first torsion rod 30a. A second plate 67 includes a second support 70 on an opposite side of the main body 60 and extending from the second plate toward the second bracket 22 and hinge 20b. The second support 70, in assembly, is engaged by the crank arm 52 of the second torsion rod 30b. In the implementation shown, the supports 70 are defined by a shaft 72 that extends between and through the plates 66, 67, and/or by knobs 74 received on the shafts 72 or otherwise carried by the main body 60. As such, the supports 70 may be carried by the body 60 and be adapted to engage a portion of the torsion rods 30a,b, and wherein the driver 62 is adapted to engage the torsion rods at a location spaced from the portion of the torsion rods engaged with the supports.

The main body 60 also includes one or more stops, which may include or be defined by retaining features such as catches 76 arranged to receive and retain a retainer 78. The catches 76 may be recesses (such as is shown) or protrusions or both, or any other feature that may engage and resist movement of the retainer 78. The retainer 78 is moved relative to the catch or catches 76 as the driver moves, and the retainer is received by or engaged with a catch 76 to hold the driver 62 in a given position relative to the main body 60, as will be set forth in more detail below. In the example shown, each plate 66, 67 includes multiple aligned catches 76 and a pin defines the retainer 78 and extends between the plates. The pin 78 is received near one end in a catch 76 of the first plate 66 and near its other end in a catch in the second plate 67. To improve engagement of the retainer 78 with the catches 76, the retainer 78 may be yieldably biased in a direction toward the catches. For example, the catch or catches 76 in each plate 66, 67 are spaced about the periphery of the plates, the retainer 78 slides about the peripheries 80 of the plates as the driver 62 is moved and the retainer is yieldably biased inwardly, toward and against the periphery 80 of the plates. In the example shown, a biasing member 82 (e.g. a spring) extends between the shaft 72 and the retainer 78 to bias the retainer toward the shaft.

Further, the catches 76 may have an outwardly extending stop surface 84 that is angled or oriented to oppose reverse movement of the driver 62, where forward movement of the driver 62 increases torque on the torsion rods 30a,b and reverse movement of the driver 62 would reduce torque on the torsion rods 30a,b. And opposite the stop surface 84, the catches 76 may include an exit surface 86 that is inclined radially outwardly (relative to the axis of rotation 88 of the driver 62) to resist, to a desired extent, but permit the retainer 78 to move out of a catch 76 when driven by the driver 62. Thus, the retainer 78 is releasably held in a catch 76 with which it is aligned but may be moved out of that catch 76 by the driver 62 to increase torsion in the torsion rods 30a,b, as set forth below.

The driver 62 may be coupled the main body 60 at a pivot so that the driver 62 may be rotated or pivoted relative to the main body 60. In the example shown, the driver 62 is received between the plates 66, 67 of the main body 60, and the shaft 72 extends through the driver 62 to define the driver pivot and pivot axis 88. Of course, other arrangements may be utilized. A free end 90 of the driver 62 may extend outwardly beyond the periphery 80 of the plates 66, 67 and include one or more openings 92, 94 adapted to receive the second portions 58 of the crank arms 52 to couple the torsion rods 30a,b to the driver 62. In the example shown, the driver 62 is hollow (e.g. a rectangular or cylindrical tube) and the second portions 58 of the crank arms 52 extend into the driver 62 through an opening 92, 94. To prevent the second ends 50 of the torsion rods 30a,b from engaging each other, the openings 92, 94 may be provided in the driver 62 spaced at different distances from the end 90 of the driver 62 (e.g. opening 92 receives the end of the first torsion rod 30a and opening 94 receives the end of the second torsion rod 30b).

Further, the driver 62 may include a slot 96 through which the retainer 78 extends. The slot 96 is oriented to permit the pin 78 to move toward and away from the shaft 72 as the retainer moves into and out of the catches 76. In the implementation shown, the slot 96 has a length that extends radially (relative to the pivot axis 88 of the driver 62) that is longer than a width of the slot (dimension transverse to the length); the width of the slot may be close to the diameter of the retainer 78. As the driver 62 is pivoted or moved relative to the plates 66, 67, the driver 62 engages and moves the retainer 78 relative to the plates and successive, circumferentially spaced catches 76, as will be described in more detail below.

In assembly, the end 38 of the first torsion rod 30a is inserted into its associated bracket 22, and the end 38 of the second torsion rod 30b is inserted into its associated bracket 22. The second ends 50 of each torsion rod 30a,b are then inserted into the corresponding opening 92, 94 in the main body plates 66, 67, with the first portion 56 of each crank arm 52 aligned with the adjacent support 70. The driver 62 is initially in a first position wherein minimal or no torsion needs to be applied to the crank arms 52 to align the second portions 58 with the openings 92, 94. In other words, the first position of the driver 62 provides the openings 92, 94 generally aligned with the second ends 58 of the crank arms 52 in the untorqued or at rest state of the torsion rods 30a,b. Hence, the initial assembly can be done relatively easily and without much force applied to the torsion rods 30a,b.

After the torsion rods 30a,b are coupled to both the brackets 22 and the torsion device 32, the driver 62 may be rotated in a first direction, shown as counter-clockwise in FIG. 3. During this movement, the pin 78, which is trapped in the driver slot 96, is moved from a first catch 76 toward one or more successive aligned catches 76. Also during this movement, the second end 58 of the crank arm 52 is displaced (e.g. rotated) relative to the nominal torsion rod axis 54, and the first portion 56 of the crank arm 52 of each torsion rod 30a,b bears on an associated support 70 to constrain the position and orientation of the torsion rods, and the crank arm movement causes a torsional force generally along the nominal axis 54 of the torsion rods 30a,b. The farther the driver 62 is rotated in the first direction, the greater the torsional force that is applied to the torsion rods 30a,b. This torsional force is then stored as potential energy within the torsion rods 30a,b, and upon release or unlatching of the deck lid 12, the stored energy in the torsion rods is applied to the brackets 22 to open or assist in opening the deck lid.

Accordingly, during vehicle assembly, the driver 62 can be moved from an initial, first position that facilitates assembly, to a second position (which may be a final operating position or an intermediate position) that provides some stored energy in the torsion rods 30a,b to prevent the torsion rods from unintentionally decoupling from the torsion device 32 or for other reasons. This facilitates an initial assembly into the vehicle without having to install the torsion rods 30a,b under the maximum desired torque, which may be difficult, and without requiring that the torsion rod installation/assembly occur at a certain phase of vehicle assembly.

For example, if the torsion rods 30a,b are placed under maximum or final desired torque prior to the vehicle being painted, which usually involves significant heat, the torsion rods 30a,b may be annealed during that process and the torque therein greatly reduced. To inhibit or prevent this, the torsion rods 30a,b can initially be installed with little or no torque applied thereto, and after the vehicle 10 has gone through any process that may affect the torsion rods, the driver can be moved to a final position (e.g. pin 78 received in a desired catch 76) to provide a desired torque level in the torsion rods.

Further, one design of torsion device 32 may be used with different torsion rods, or in applications requiring different operating torque values in the torsion rods, by providing multiple different end positions (e.g. defined by catches 76 at different locations on the plates 66, 67), each associated with a different torque value. A pin or other stop 98 may be adjustably carried by or associated with one or both plates 66, 67 to limit driver movement relative to the plates. In the example shown, multiple holes 100 are provided circumferentially spaced along a plate 66, and a stop pin 98 may be adjustably moved among the holes. The maximum rotation of the driver 62 may be limited by engagement of the driver with the stop pin 98. Hence, a desired final torque or magnitude of stored energy may repeatedly and reliably be applied to the torsion rods 30a,b, and overtorquing of the torsion rods may be prevented. Should the torsion rods 30a,b need to be removed from the vehicle 10, such as to permit the deck lid 12, a bracket 22, hinge 20a,b or other associated component to be serviced or replaced, the pin 78 could be displaced from a catch 76 and radially outwardly held in the slot 96 to clear the catch stop surface 84 and prevent receipt of the pin 78 in a catch 76 as the driver 62 is moved in a second direction (e.g. clockwise as shown in FIG. 3). This reduces or removes the energy stored in the torsion rods 30a,b and facilitates disassembly of the torsion rods from the torsion device 32 and brackets 22.

What is claimed is:
1. A torsion rod preload device, comprising:
a body having at least one stop and a base adapted to be connected to a vehicle;
a driver carried by the body for movement relative to the body, the driver adapted to engage two torsion rods so that movement of the driver relative to the body increases a torsion force within both torsion rods, and
a retainer carried by one or both of the body and the driver, the retainer being movable by the driver as the driver moves relative to the body and the retainer being engageable with the stop to inhibit or prevent movement of the driver when the retainer is engaged with the stop to maintain a desired magnitude of stored energy in the torsion rods.
2. The device of claim 1, wherein the body includes two and the driver is pivoted to the body between the two walls.

3. The device of claim 2 wherein the at least one stop includes two stops, each wall includes one of the stops and the retainer may be engaged with the stop of both walls at the same time.

4. The device of claim 1 wherein the body includes multiple stops and the retainer is selectively engageable with the stops as the driver moves relative to the body so that the retainer engages a first one of the stops when the driver is moved a first amount relative to the body to provide a first torsion force within the torsion rod and the retainer engages a second one of the stops when the driver is moved a second amount relative to the body to provide second torsion force within the torsion rod, wherein the second amount is greater than the first amount and the second force is greater than the first force.

5. The device of claim 1 which also includes a support carried by the body and adapted to engage a portion of the torsion rod, and wherein driver is adapted to engage the torsion rod at a location spaced from the portion of the torsion rod engaged with the support.

6. A torsion rod preload device, comprising:
a body having at least one stop and a base adapted to be connected to a vehicle;
a driver carried by the body for movement relative to the body, the driver adapted to engage a torsion rod so that movement of the driver relative to the body increases a torsion force within the torsion rod, and
a retainer carried by one or both of the body and the driver, the retainer being movable by the driver as the driver moves relative to the body and the retainer being engageable with the stop to inhibit or prevent movement of the driver when the retainer is engaged with the stop to maintain a desired magnitude of stored energy in the torsion rod, wherein the driver includes a slot and the retainer extends into the slot so that the retainer moves relative to the body as the driver moves, and wherein a portion of the stop may displace the retainer within the slot and relative to the driver.

7. A torsion rod assembly for a vehicle panel, comprising:
a body having at least on stop and a base adapted to be connected to a vehicle;
a driver carried by the body for movement relative to the body;
a first torsion rod coupled to the driver so that movement of the driver relative to the body increases a torsion force within the first torsion rod;
a second torsion rod coupled to the driver so that movement of the driver relative to the body increases a torsion force within the second torsion rod; and
a retainer carried by one or both of the body and the driver, and being movable by the driver and relative to the stop as the driver moves relative to the body, wherein the retainer is engageable with the stop to inhibit or prevent movement of the driver when the retainer is engaged with the stop to maintain a desired torsion force in the torsion rod.

8. The device of claim 7, wherein the body includes two walls, and the driver is pivoted to the body between the two walls.

9. The device of claim 8 wherein the at least one stop includes two stops, each wall includes one of the stops and the retainer may be engaged with the stop of both walls at the same time.

10. The device of claim 7 wherein the body includes multiple stops and the retainer is selectively engageable with the stops as the driver moves relative to the body so that the retainer engages a first one of the stops when the driver is moved a first amount relative to the body to provide a first torsion force within the first torsion rod and the second torsion rod, and the retainer engages a second one of the stops when the driver is moved a second amount relative to the body to provide second torsion force within the first torsion rod and the second torsion rod, wherein the second amount is greater than the first amount and the second force is greater than the first force.

11. The device of claim 7 which also includes a first support carried by the body so that the first support engages a portion of the first torsion rod and a second support carried by the body so that the second support engages a portion of the second torsion rod, and wherein driver engages the first torsion rod at a location spaced from the portion of the first torsion rod engaged with the first support and driver engages the second torsion rod at a location spaced from the portion of the second torsion rod engaged with the second support.

12. The device of claim 11 wherein the portion of the first torsion rod engaged with the first support remains essentially stationary as the driver is moved, and the portion of the second torsion rod engaged with the second support remains essentially stationary as the driver is moved.

13. The device of claim 7 wherein the driver includes a slot and the retainer extends into the slot so that the retainer moves relative to the body as the driver moves, and wherein a portion of the stop may displace the retainer within the slot and relative to the driver.

14. The device of claim 1 which also includes a shaft carried by the body and about which the driver rotates, and wherein the driver has a free end and the retainer is received between the free end and the shaft.

15. The device of claim 14 which also includes a biasing member coupled to the shaft and to the retainer to yieldably bias the retainer toward the shaft.

16. The device of claim 7 which also includes a shaft carried by the body and about which the driver rotates, and wherein the driver has a free end and the retainer is received between the free end and the shaft.

17. The device of claim 16 which also includes a biasing member coupled to the shaft and to the retainer to yieldably bias the retainer toward the shaft.

18. The device of claim 6 which also includes a shaft carried by the body and about which the driver rotates, and wherein the driver has a free end and the retainer and slot are located between the free end and the shaft.

19. The device of claim 18 which also includes a biasing member coupled to the shaft and to the retainer to yieldably bias the retainer toward the shaft.

* * * * *